US011271836B2

(12) United States Patent
Takagi

(10) Patent No.: US 11,271,836 B2
(45) Date of Patent: Mar. 8, 2022

(54) INFORMATION PROCESSING DEVICE AND CONTROL METHOD FOR INFORMATION PROCESSING DEVICE

(71) Applicant: OMRON Corporation, Kyoto (JP)

(72) Inventor: Hiroaki Takagi, Takatsuki (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 17/286,490

(22) PCT Filed: Oct. 18, 2019

(86) PCT No.: PCT/JP2019/041179
§ 371 (c)(1),
(2) Date: Apr. 19, 2021

(87) PCT Pub. No.: WO2020/100529
PCT Pub. Date: May 22, 2020

(65) Prior Publication Data
US 2021/0392062 A1 Dec. 16, 2021

(30) Foreign Application Priority Data
Nov. 14, 2018 (JP) .............................. JP2018-214055

(51) Int. Cl.
*H04L 12/26* (2006.01)
*H04L 43/0817* (2022.01)
(Continued)

(52) U.S. Cl.
CPC ........ *H04L 43/0817* (2013.01); *H04L 43/067* (2013.01); *H04L 43/0847* (2013.01); *H04L 43/0894* (2013.01)

(58) Field of Classification Search
CPC ..................................................... H04L 43/067
See application file for complete search history.

(56) References Cited

U.S. PATENT DOCUMENTS 10,111,228 B2 * 10/2018 Griesdorf ............. H04B 17/309
2003/0045313 A1 * 3/2003 Iwamatsu ............. H04B 7/0865
455/513
(Continued)

FOREIGN PATENT DOCUMENTS

JP 2003308107 10/2003
JP 2004185570 7/2004
(Continued)

OTHER PUBLICATIONS

"International Search Report (Form PCT/ISA/210) of PCT/JP2019/041179," dated Jan. 7, 2020, with English translation thereof, pp. 1-4.
(Continued)

Primary Examiner — Philip C Lee
(74) Attorney, Agent, or Firm — JCIPRNET

(57) ABSTRACT

The present invention acquires, from control data for an apparatus to be controlled in a normal operation, a relationship between a noise included in a reception signal from a cable and the apparatus to be controlled. An information processing device (13) is provided with a correlation derivation unit (13212, 13212d) for deriving a correlation value between a variation of a time-series data (1331) of a noise included in a signal input through a cable in a network and a variation of a time-series data (1332) of control data of an apparatus to be controlled (11, 16) in the network.

11 Claims, 12 Drawing Sheets

(51) Int. Cl.
*H04L 43/067* (2022.01)
*H04L 43/0894* (2022.01)
*H04L 43/0823* (2022.01)

(56) References Cited

U.S. PATENT DOCUMENTS

| | | | | |
|---|---|---|---|---|
| 2004/0137929 | A1* | 7/2004 | Jones | H04N 21/41407 455/517 |
| 2009/0201150 | A1* | 8/2009 | Becker | G08C 17/02 340/539.21 |
| 2009/0247105 | A1* | 10/2009 | Mak | H03G 3/3084 455/237.1 |
| 2009/0254199 | A1 | 10/2009 | Vrba et al. | |
| 2013/0201316 | A1* | 8/2013 | Binder | H04L 67/12 348/77 |
| 2016/0255548 | A1* | 9/2016 | Cedergren | H04W 36/30 370/332 |
| 2016/0338603 | A1* | 11/2016 | Nakata | G06K 9/0055 |
| 2017/0093907 | A1* | 3/2017 | Srivastava | H04L 63/1458 |
| 2019/0243799 | A1* | 8/2019 | Gross | H04W 4/38 |

FOREIGN PATENT DOCUMENTS

| | | |
|---|---|---|
| JP | 2010081173 | 4/2010 |
| JP | 2011191130 | 9/2011 |
| JP | 2018032262 | 3/2018 |
| JP | 2019096033 | 6/2019 |

OTHER PUBLICATIONS

"Written Opinion of the International Searching Authority (Form PCT/ISA/237) of PCT/JP2019/041179," dated Jan. 7, 2020, with English translation thereof, pp. 1-6.

Office Action of Japan Counterpart Application, with English translation thereof, dated Nov. 24, 2021, pp. 1-8.

* cited by examiner

INFORMATION PROCESSING DEVICE AND CONTROL METHOD FOR INFORMATION PROCESSING DEVICE

CROSS-REFERENCE TO RELATED APPLICATION

This application is a 371 application of the International PCT application serial no. PCT/JP2019/041179, filed on Oct. 18, 2019, which claims the priority benefits of Japan Patent Application No. 2018-214055,filed on Nov. 14, 2018. The entirety of each of the above-mentioned patent applications is hereby incorporated by reference herein and made a part of this specification.

TECHNICAL FIELD

The invention relates to an information processing device that analyzes noise included in a signal.

BACKGROUND ART

A device for sequence control of a load device or the like is known as a related art. For example, Patent Literature 1 discloses a technique in which a programmable controller does not malfunction even when noise exceeding a specification range that cannot be absorbed by hardware is superimposed.

Specifically, the programmable controller disclosed in Patent Literature 1 forms a loopback system for noise detection signals. In the loopback system, a noise detection signal conducted by a noise detection means is converted into a digital signal. Based on the digital signal, it is determined whether or not a state such as a first state such as an on state of the noise detection signal or a second state such as an off state thereof can be recognized. When it has been determined that the predetermined state cannot be recognized, it is determined that noise at a level exceeding a permissible range is superimposed on the noise detection signal. The output of a sequence control signal to a noise source portion corresponding to the noise detection means is stopped or the noise source portion is disconnected from the sequence control system.

More specifically, Patent Literature 1 discloses a configuration in which each of a plurality of switches switches connection and disconnection of a corresponding signal line. In the configuration disclosed in Patent Literature 1, if noise is detected when a specific switch is on and not detected when the switch is off, a signal line corresponding to the specific switch is specified as a generation source of noise.

CITATION LIST

Patent Literature

Patent Literature 1

Patent Literature 1: Japanese Patent Laid-Open No. 2004-185570 (published on Jul. 2, 2004)

SUMMARY OF INVENTION

Technical Problem

However, in the related art described above, to specify a generation source of noise included in a received signal from a cable, it is essential to perform a test for detecting noise by switching connection and disconnection of candidate generation sources of noise in the loopback system. That is, in the related art described above, it is not possible to derive the correlations between noise and the normal operations of the candidate generation sources of the noise.

It is an object of an aspect of the invention to realize an information processing device capable of obtaining a relationship between noise and an apparatus to be controlled from control data of the apparatus to be controlled in normal operation.

Solution to Problem

In order to solve the above problems, an information processing device according to an aspect of the invention includes an acquisition unit configured to acquire time-series data of a signal quality indicating a level of noise included in a signal input through a cable in a network and time-series data of control data for controlling an operation of an apparatus to be controlled in the network and a correlation derivation unit configured to derive a correlation value between a variation in the time-series data of the signal quality and a variation in the time-series data of the control data.

A control method for an information processing device according to an aspect of the invention includes an acquisition step of acquiring time-series data of a signal quality indicating a level of noise included in a signal input through a cable in a network and time-series data of control data for controlling an operation of an apparatus to be controlled in the network, and a correlation derivation step of deriving a correlation value between a variation in the time-series data of the signal quality and a variation in the time-series data of the control data.

Advantageous Effects of Invention

According to an aspect of the invention, a relationship between noise and an apparatus to be controlled can be obtained from control data of the apparatus to be controlled in normal operation.

Figure 5:
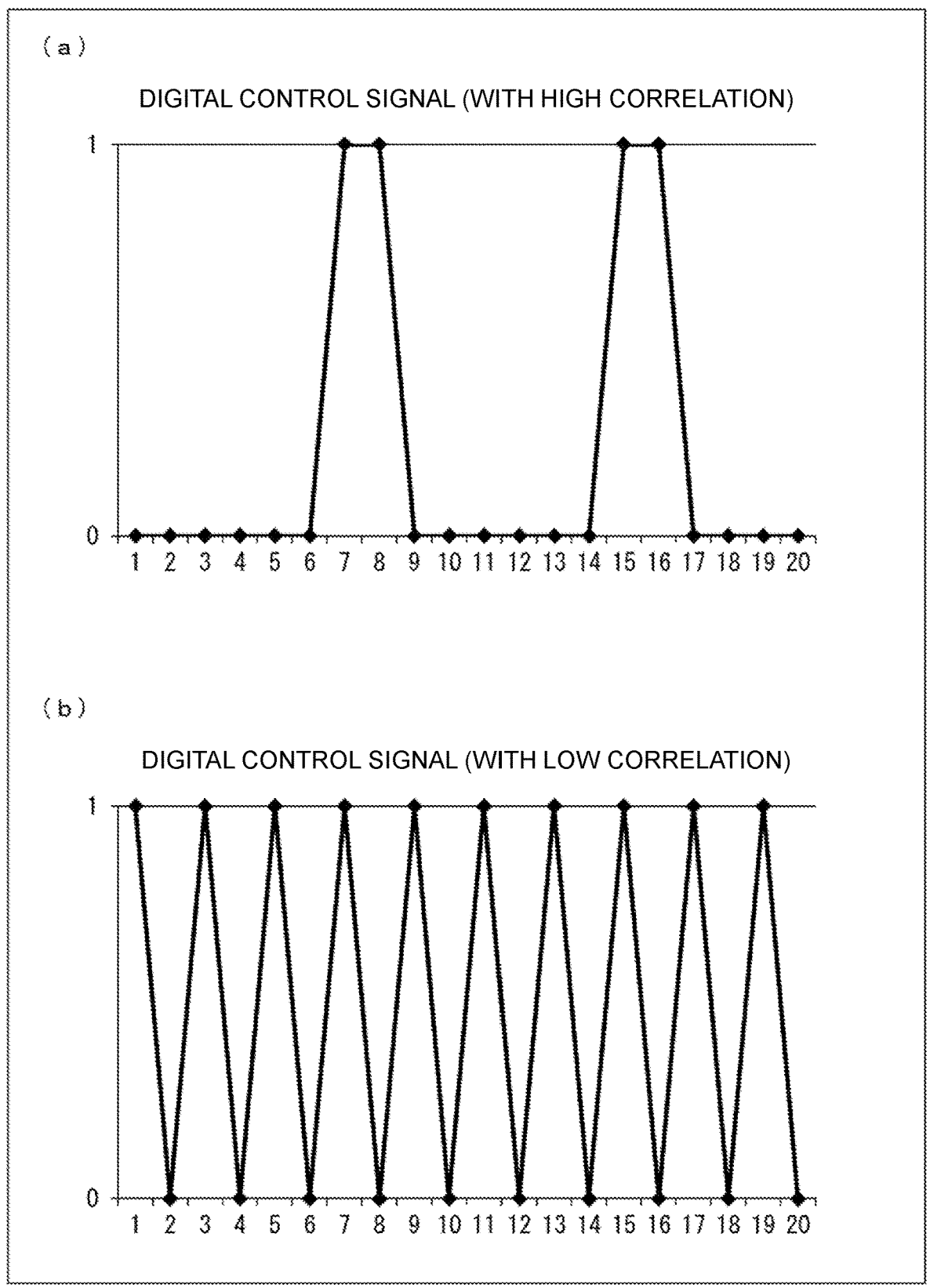

(a) and (b) of FIG. 5 are diagrams showing examples of time-series data of control data which is a digital signal according to the first embodiment of the invention.

Figure 6:
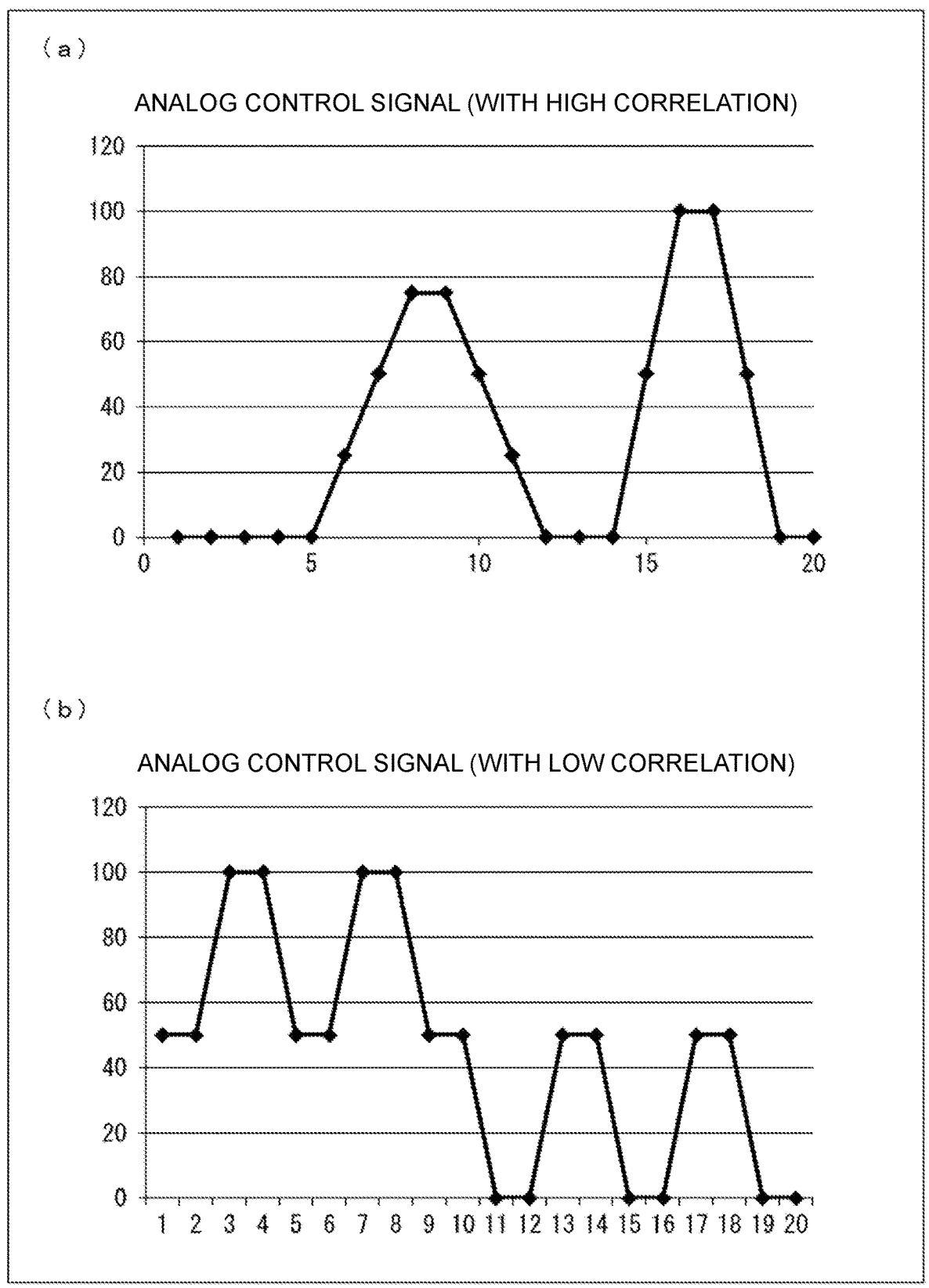

(a) and (b) of FIG. 6 are diagrams showing examples of time-series data of control data which is an analog signal according to the first embodiment of the invention.

Figures 7, 8:
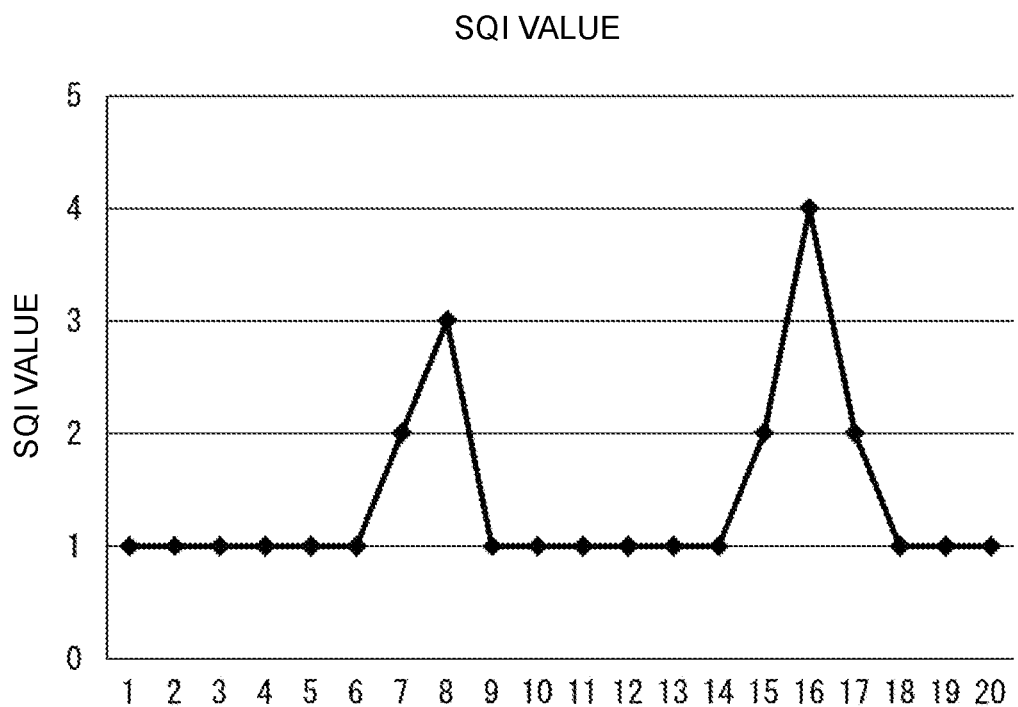

FIG. 7 is a diagram showing an example of time-series data of signal quality according to the first embodiment of the invention.

FIG. 8 is a diagram showing an example of a calculation formula used to derive the correlation value by a correlation derivation unit according to the first embodiment of the invention.

Figure 9:
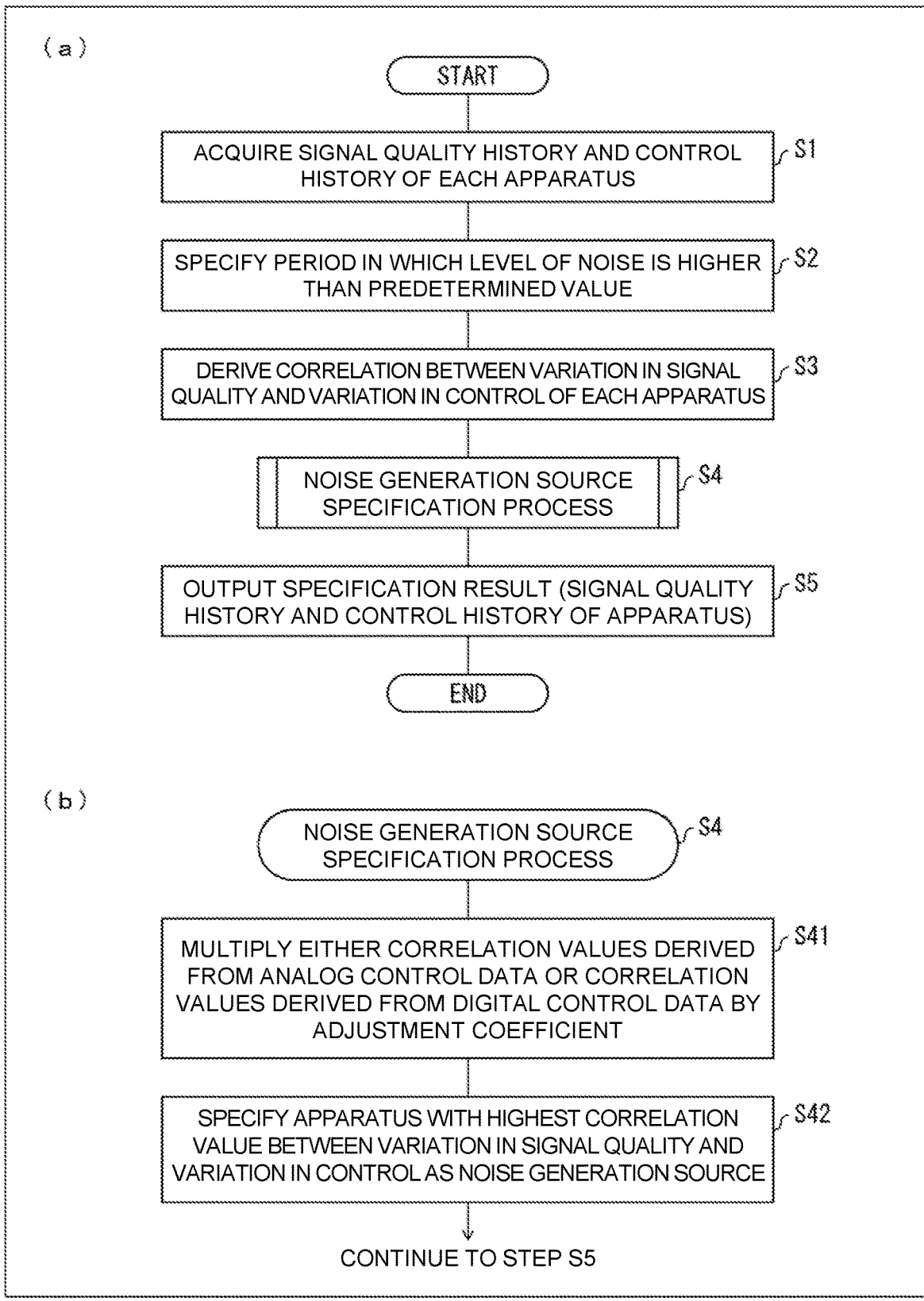

(a) and (b) of FIG. 9 are flowcharts showing an example of a flow of a process executed by a generation source specification control unit according to the first embodiment of the invention.

Figure 10:
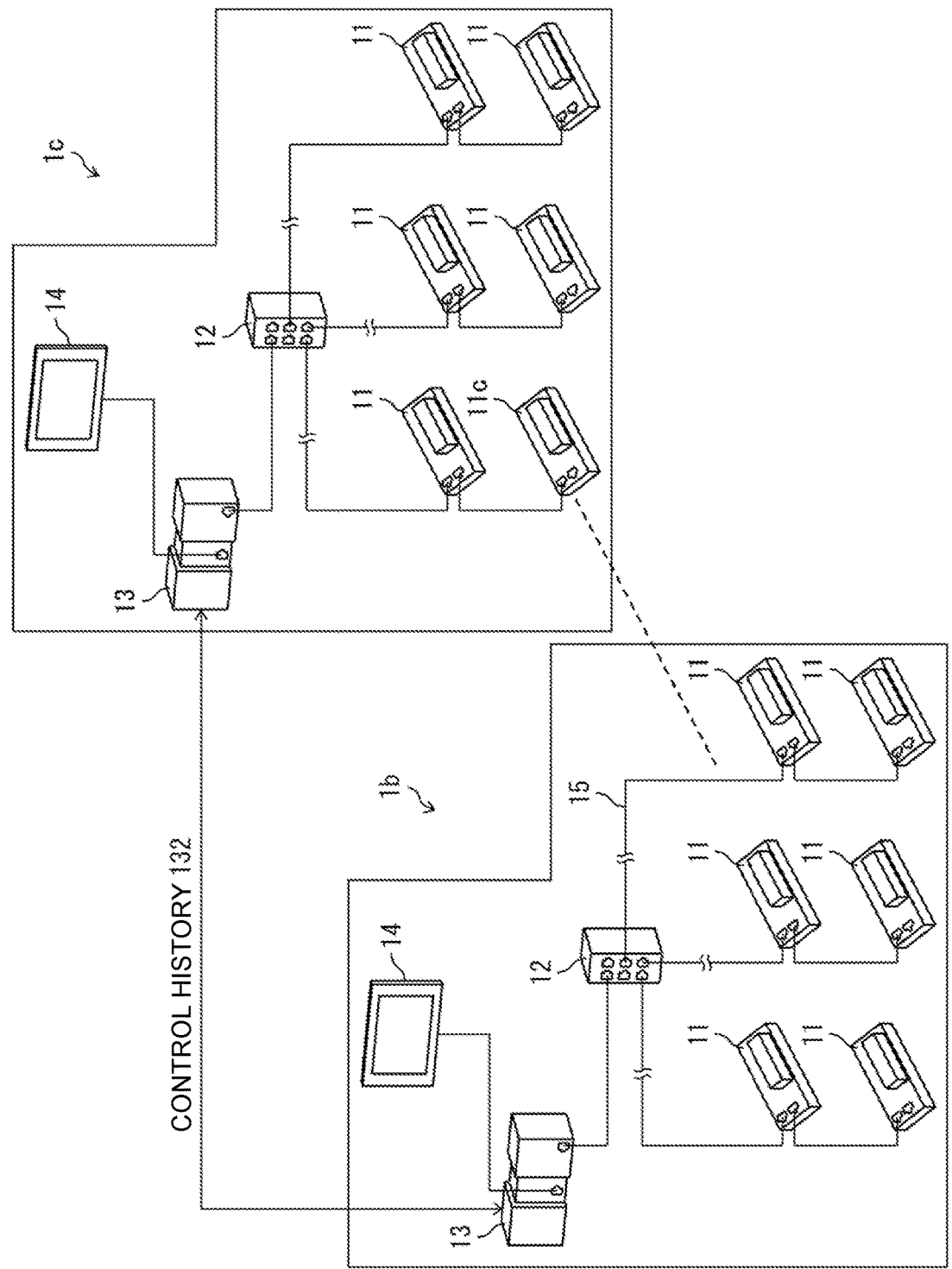

FIG. 10 is a diagram showing a modification of a master-slave control system to which the master device according to the first embodiment of the invention is applied.

Figure 11:
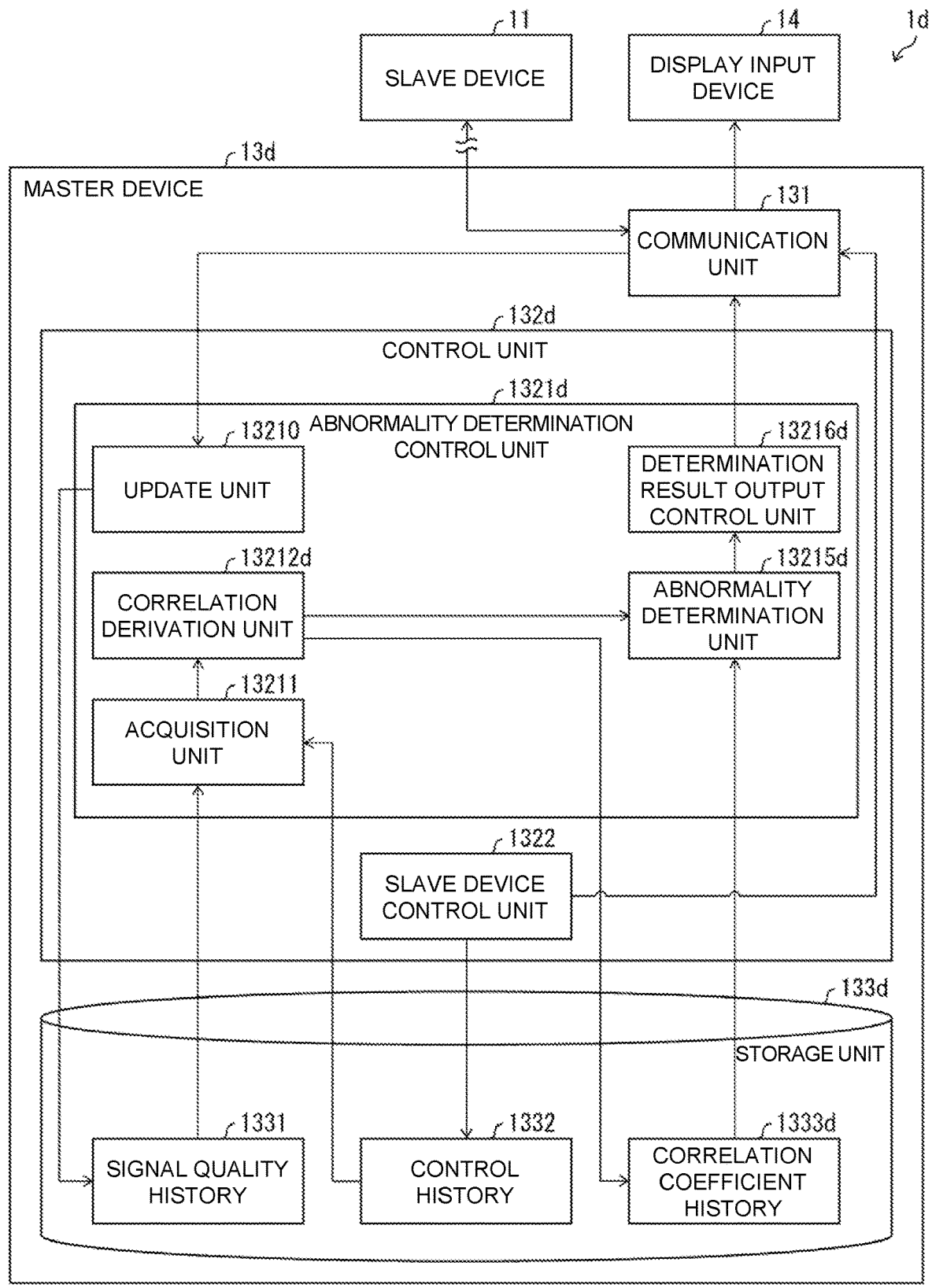

FIG. 11 is a block diagram showing a configuration of a master device according to a second embodiment of the invention.

Figure 12:
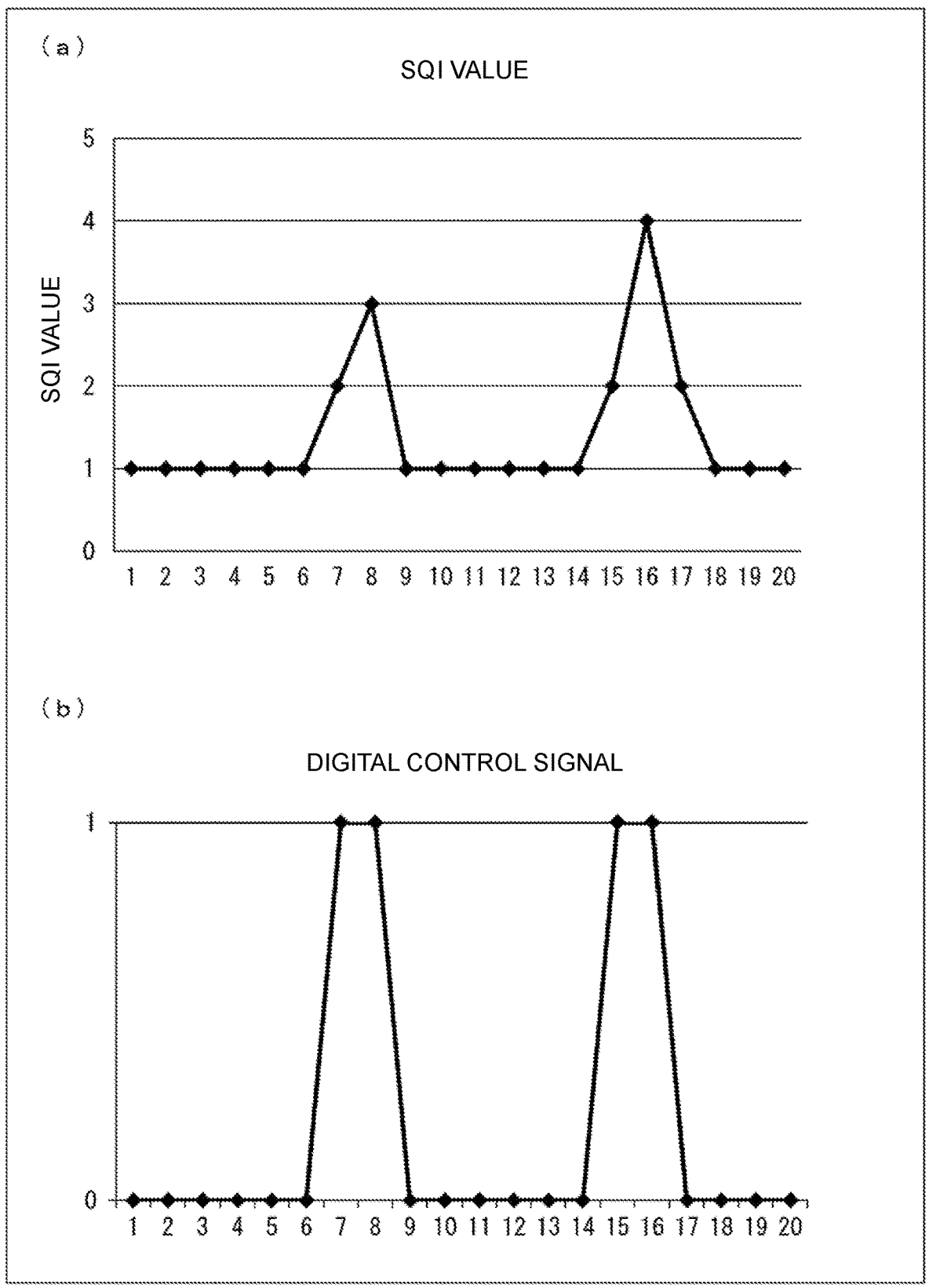

(a) of FIG. 12 is a diagram showing an example of time-series data of an SQI value (a signal quality) when an apparatus to be controlled is in a normal state according to the second embodiment of the invention and (b) of FIG. 12 is a diagram showing an example of time-series data of a digital control signal of the apparatus to be controlled when the apparatus to be controlled is in a normal state according to the second embodiment of the invention.

Figure 13:
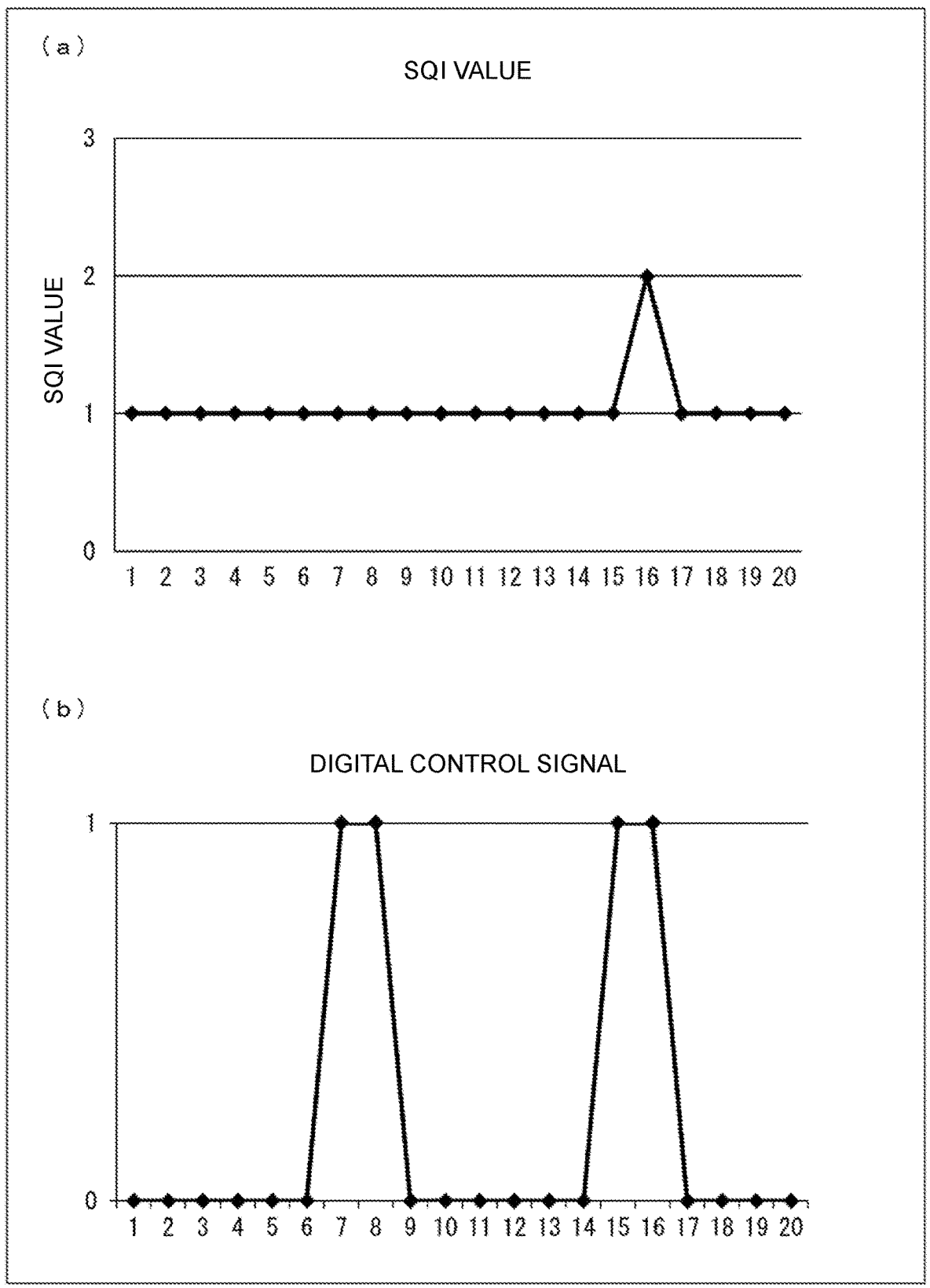

(a) of FIG. 13 is a diagram showing an example of time-series data of an SQI value (a signal quality) when the apparatus to be controlled is in an abnormal state according to the second embodiment of the invention and (b) of FIG. 13 is a diagram showing an example of time-series data of a digital control signal of the apparatus to be controlled when the apparatus to be controlled is in an abnormal state according to the second embodiment of the invention.

Figure 14:
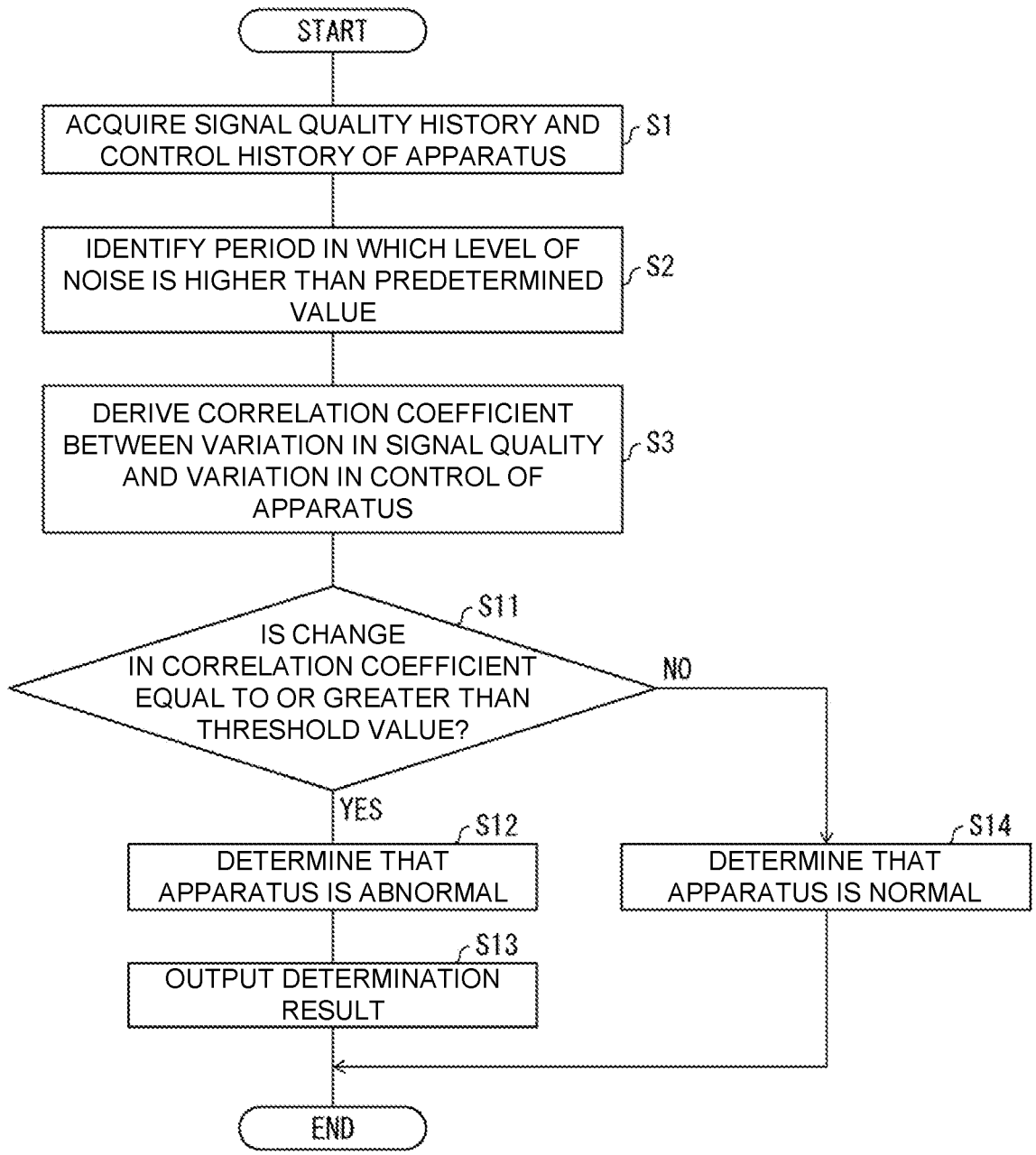

FIG. 14 is a flowchart showing an example of a flow of a process executed by an abnormality determination control unit according to the second embodiment of the invention.

DESCRIPTION OF EMBODIMENTS

First Embodiment

Hereinafter, an embodiment according to an aspect of the invention (hereinafter also referred to as "the present embodiment") will be described with reference to the drawings.

§ 1 Exemplary Application

Figure 2:
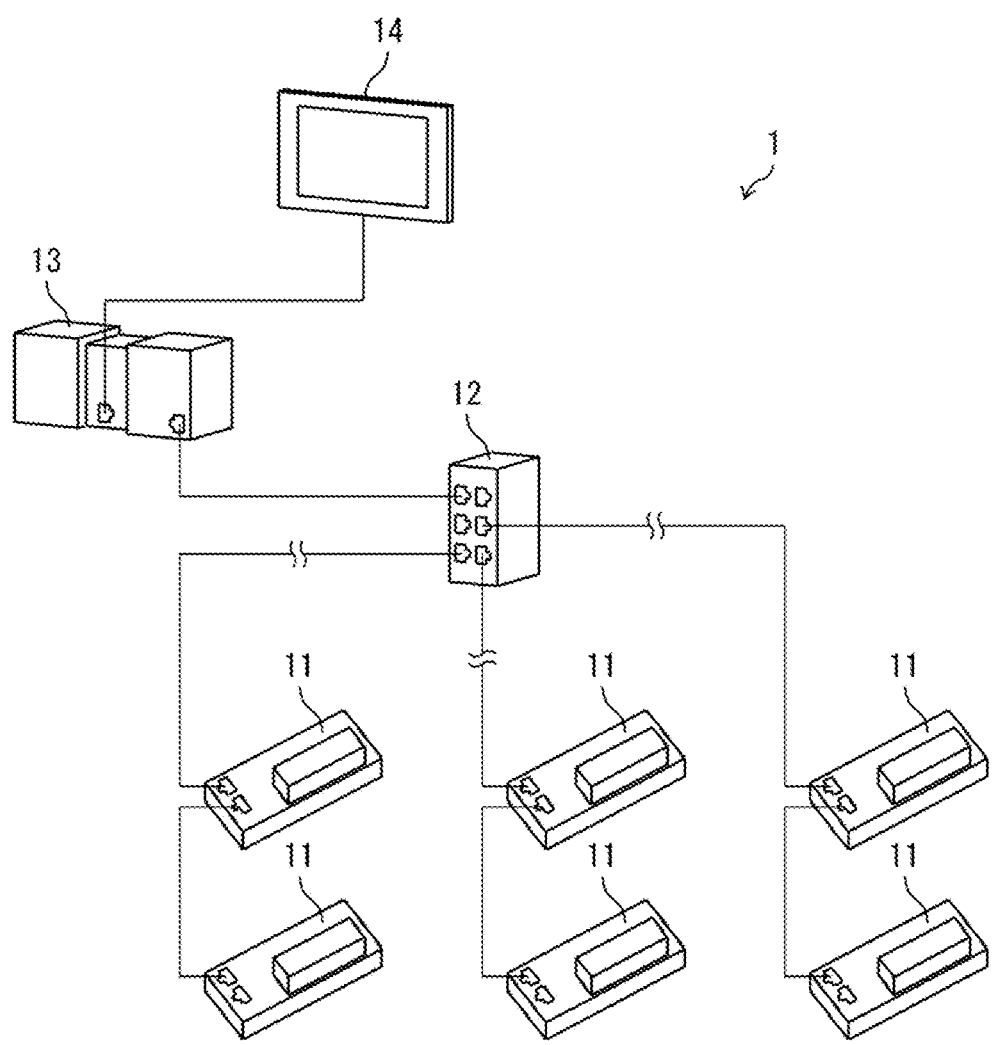
FIG. 2 is a diagram showing an example of a master-slave control system to which the master device according to the first embodiment of the invention is applied.

FIG. 2 is a diagram showing an example of a master-slave control system 1 to which a master device 13 (an information processing device) according to the present embodiment is applied. First, an outline of an exemplary application of the master device 13 will be described with reference to FIG. 2. As shown in FIG. 2, the master-slave control system 1 includes a master device 13. The master-slave control system 1 also includes an apparatus to be controlled that is controlled by the master device 13. The apparatus to be controlled is a slave device 11 shown in FIG. 2 or an external device 16 connected to the slave device 11 (see FIG. 3).

The master device 13 acquires time-series data of signal quality indicating the level of noise included in a signal input through a cable in a network in the master-slave control system 1. The master device 13 also acquires time-series data of control data for controlling the operation of the apparatus to be controlled in the network in the master-slave control system 1. The master device 13 derives a correlation value between a variation in the acquired time-series data of the signal quality and a variation in the acquired time-series data of the control data.

Examples of noise mixed in a signal in the cable include, for example, the following.

1. Noise Due to Mechanical Factors

Noise due to mechanical factors includes mechanical vibration.

Here, mechanical vibration causes noise to be mixed into a signal in the cable when an electrical connection between the cable and an apparatus to be controlled is incomplete.

2. Electrical Noise

Electrical noise is applied to the cable and mixed into a signal in the cable. For example, electrical noise is electromagnetic noise that propagates in the air from an apparatus to be controlled installed near the cable and is mixed into a signal in the cable. Other examples of electrical noise include conduction noise generated from a servo mechanism and mixed into a signal in the cable. Conduction noise can be mixed into a signal in the cable and cause the apparatus to which the signal is input to malfunction. Electrical noise can also be referred to as external noise.

According to the above configuration, a relationship between noise included in a signal input through the cable and the apparatus to be controlled can be obtained from a variation in the time-series data of the signal quality of the signal input through the cable and a variation in the time-series data of the control data. For example, a relationship between noise and the apparatus to be controlled can be obtained from control data of the apparatus to be controlled in normal operation.

The master-slave control system 1 according to the present embodiment may include a plurality of apparatuses to be controlled. The master slave 13 derives a correlation value between a variation in time-series data of an acquired signal quality and a variation in time-series data of control data for controlling each apparatus to be controlled. The master device 13 specifies a generation source of noise included in the signal input through the cable in the network from a plurality of apparatuses to be controlled according to the correlation values.

In the example shown in FIG. 2, the cable used for signal input and the apparatuses to be controlled are present in one network that is controlled by one master device 13 (controller). In other words, a plurality of apparatuses to be controlled according to the present embodiment are present in one network including the cable which is controlled by one controller.

According to the above configuration, it is possible to specify a generation source of noise from a plurality of apparatuses to be controlled in one network that is controlled by one master device 13.

§ 2 Exemplary Configuration (Master-Slave Control System 1)

The master-slave control system 1 is a system for realizing automation of a manufacturing process in a factory. In an example, as shown in FIG. 2, the master-slave control system 1 includes slave devices 11, a signal relay device 12, a master device 13, a display input device 14, and the like. In the master-slave control system 1, data frames are sequentially transferred through a network connecting the master device 13 and a slave device 11, whereby data is transmitted and received between the two devices. In the example shown in FIG. 2, a communication path formed by the slave devices 11 is branched into a plurality of communication paths on the communication downstream side of the signal relay device 12.

(Slave Device 11)

Each slave device 11 executes one or more functions relating to a manufacturing process under the control of the master device 13. The slave device 11 communicates with the master device 13 through the network and controls the drive of the external device 16 under the control of the master device 13. The slave device 11 functions as a relay device for transmitting and receiving data between the master device 13 and the external device 16. The slave device 11 is not limited to the relay device. Examples of the slave device 11 other than the relay device include a servo mechanism and a robot controller that controls a robot.

Figure 3:
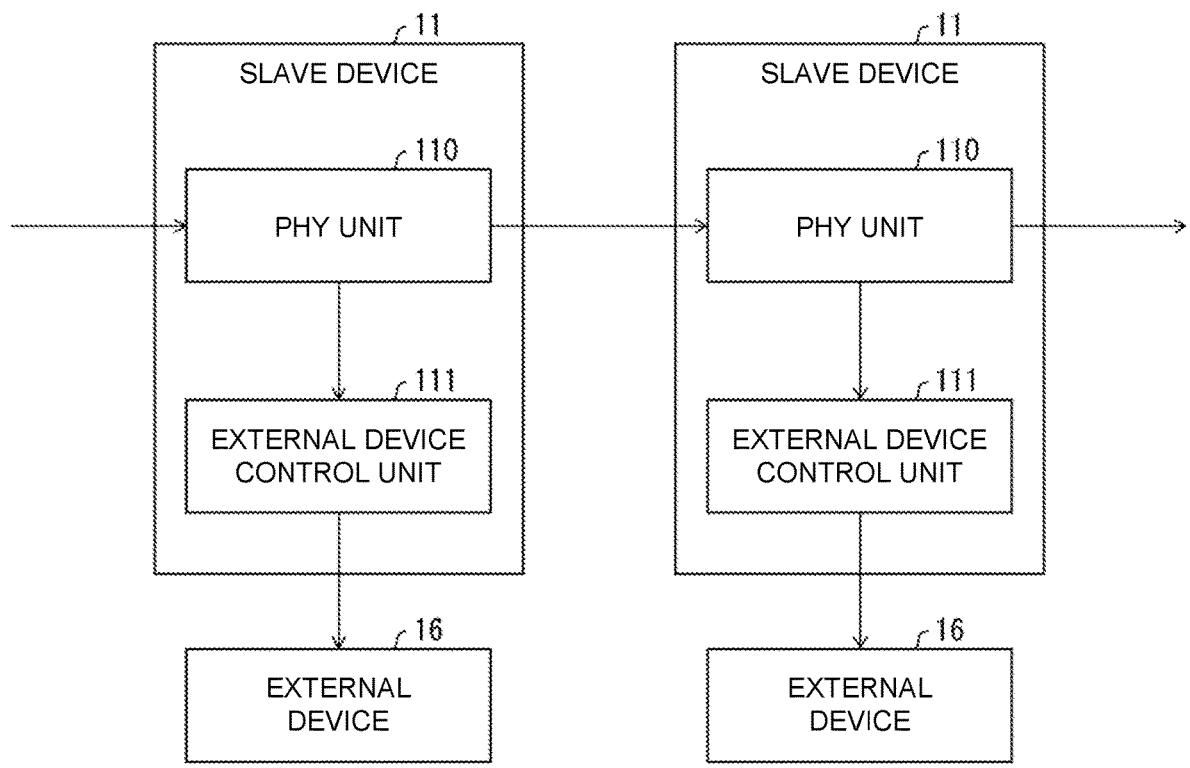
FIG. 3 is a block diagram showing an example of a configuration of a slave device according to the first embodiment of the invention.

FIG. 3 is a block diagram showing an example of the configuration of a slave device 11 according to the present embodiment. As shown in FIG. 3, the slave device 11 includes a PHY unit 110 and an external device control unit 111.

(PHY Unit 110)

The PHY unit 110 is a communication unit for communication with a slave device 11 on the side closer to the master device 13 (on the communication upstream side) and a slave device 11 on the side farther from the master device 13 (on the communication downstream side). For example, the PHY unit 110 is a functional block representing a function executed by an element of the physical layer in which communication is performed.

Figure 4:
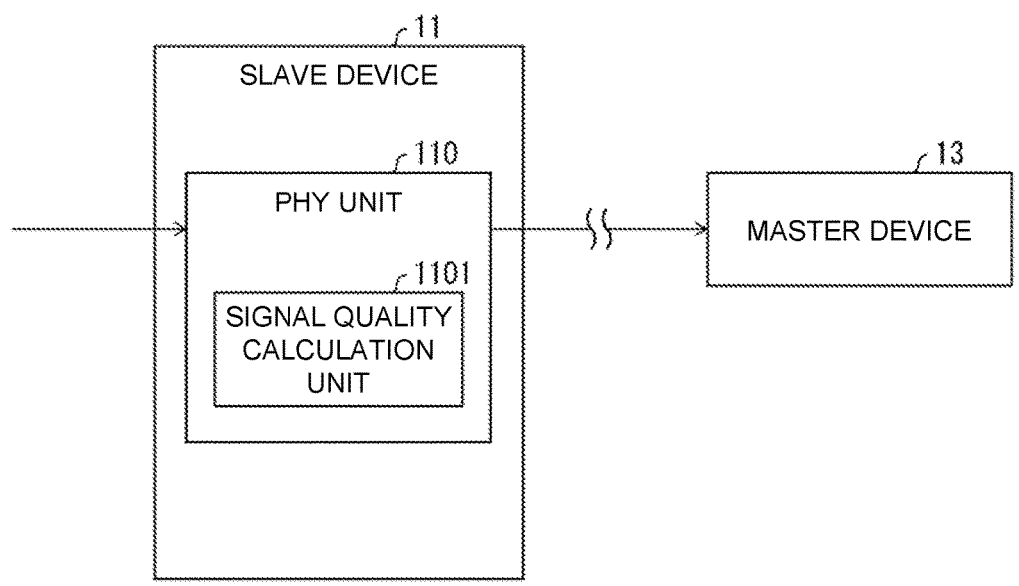
FIG. 4 is a block diagram showing an example of a configuration of a PHY unit according to the first embodiment of the invention.

FIG. 4 is a block diagram showing an example of the configuration of the PHY unit 110 according to the present embodiment. As shown in FIG. 4, the PHY unit 110 includes a signal quality calculation unit 1101. The signal quality calculation unit 1101 calculates the signal quality of a signal which has been input to the PHY unit 110 through the cable.

The signal quality calculation unit 1101 calculates, for example, an index indicating the level of noise included in the signal. The index may be, for example, the value of a signal quality indicator (SQI). The signal quality calculation unit 1101 outputs a signal indicating the calculated signal quality to the master device 13 through another slave device 11, the signal relay device 12, or the like.

(External Device Control Unit 111)

The external device control unit 111 controls the drive of the external device 16 under the control of the master device 13. The external device 16 is a machine such as a manufacturing device or an inspection device. For example, the external device 16 may be an input device such as a sensor (such as a temperature sensor or an optical sensor), a switch (such as a push button switch, a limit switch, or a pressure switch) or may be an output device such as an actuator, a relay, or a solenoid valve. In the present embodiment, particular examples of the external device 16 include a fan, a heater, a solenoid valve, and a robot (robot arm), which are devices having a high current consumption that are likely to be a generation source of noise included in a signal input through a cable. In the master-slave control system 1, the master device 13 controls the operation of the external device 16 and receives output data of the external device 16 through the slave device 11.

(Signal Relay Device 12)

The signal relay device 12 is a relay device that relays data between the slave devices 11 and an upper network including the master device 13 or the like. The signal relay device 12 is, for example, a line concentrator (hub). The signal relay device 12 can also be said to be a slave device that is connected to the master device 13 through an upper bus, that is, an upper communication network.

(Master Device 13)

The master device 13 is a control device that controls the entire master-slave control system 1 and is, for example, a programmable logic controller (PLC). The master device 13 operates as a master device of the signal relay device 12 and the slave devices 11 in the master-slave control system 1. As shown in FIG. 2, the display input device 14 or the like may be connected to the master device 13 through a connection cable or the like.

Figure 1:
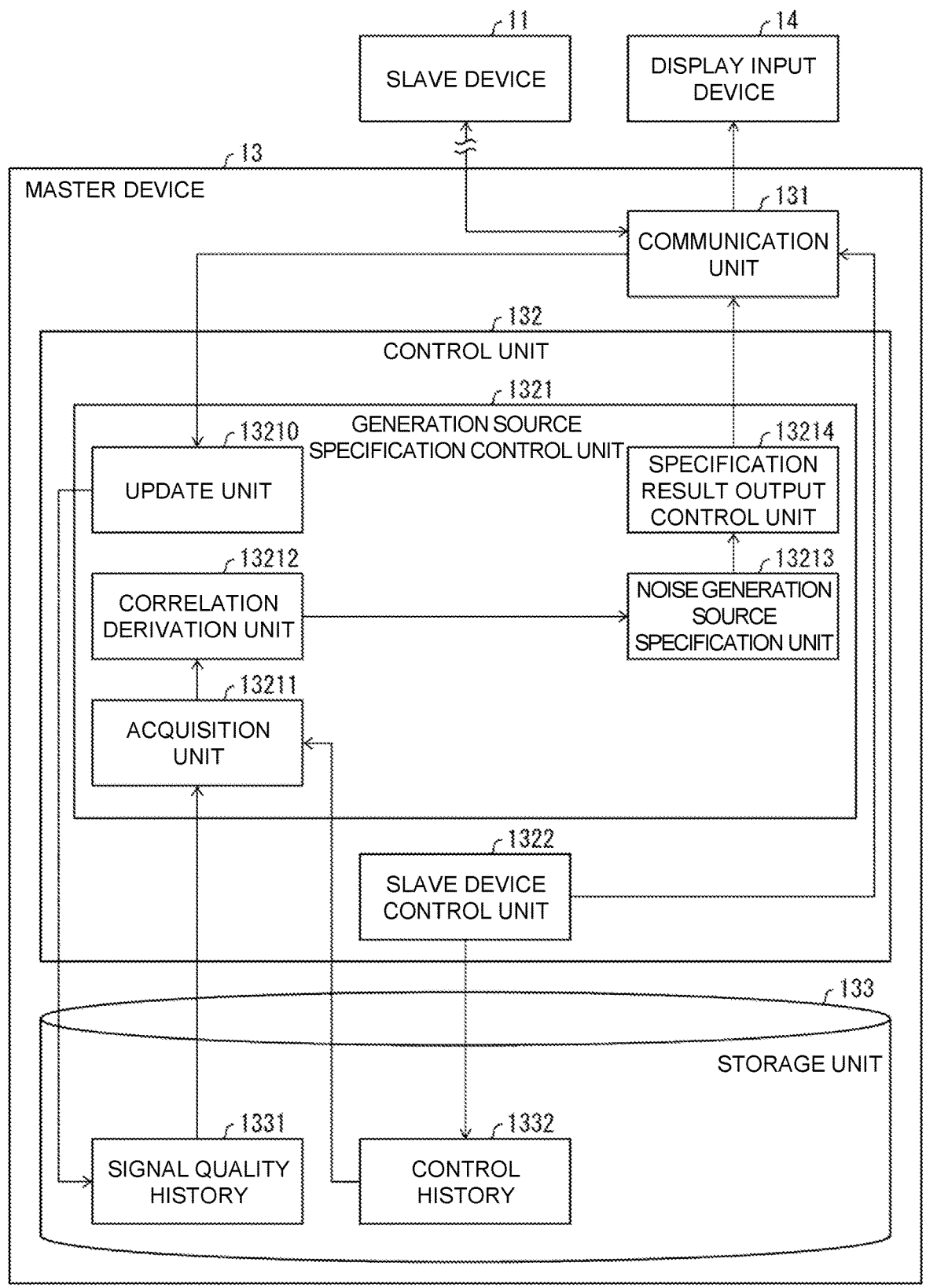
FIG. 1 is a block diagram showing a configuration of a master device according to a first embodiment of the invention.

FIG. 1 is a block diagram showing a configuration of the master device 13 according to the present embodiment. As shown in FIG. 1, the master device 13 includes a communication unit 131, a control unit 132, and a storage unit 133.

(Communication Unit 131)

The communication unit 131 communicates with the slave devices 11 through the signal relay device 12. In the present embodiment, in particular, the communication unit 131 receives, from each slave device 11, a signal indicating a signal quality calculated by the slave device 11. The communication unit 131 outputs the received signal quality to the update unit 13210.

The communication unit 131 outputs a control signal for controlling the operation of the slave device 11, a control signal for controlling the operation of the external device 16, or the like to the slave device 11.

The communication unit 131 also outputs a signal or the like indicating the result of identification performed by the noise generation source specification unit 13213 to the display input device 14 according to an instruction from the specification result output control unit 13214.

(Control Unit 132)

The control unit 132 includes a central processing unit (CPU), a random access memory (RAM), a read only memory (ROM), and the like and controls each component according to information processing. The control unit 132 includes a generation source specification control unit 1321 and a slave device control unit 1322.

(Slave Device Control Unit 1322)

The slave device control unit 1322 controls the operations of apparatuses to be controlled (slave devices 11 or external devices 16 connected to the slave devices 11). Specifically, the slave device control unit 1322 outputs, to the slave devices 11, control parameters for operation of the apparatuses to be controlled. That is, the control parameters (control data) are transmitted to the apparatuses to be controlled.

A control parameter is, for example, a digital signal instructing an apparatus to be controlled to be turned on/off. Other examples of a control parameter when the apparatus to be controlled is an apparatus having a motor include an analog signal indicating the acceleration of the motor, the speed of the motor, or the like. Examples of a control parameter when the apparatus to be controlled is a heater include an analog signal indicating temperature or the like. Examples of a control parameter when the apparatus to be controlled is a robot include command value parameters (such as, for example, velocity (m/s) and acceleration (m/s$^2$)).

A control parameter may also be a digital signal indicating acceleration, speed, temperature, and the like which is a combination of a plurality of digital signals rather than the analog signals described above.

Upon outputting a control parameter to a slave device 11, the slave device control unit 1322 updates a control history 1332 stored in the storage unit 133 using the output control parameter. The control history 1332 is time-series data of a control parameter (control data) with which the operation of the apparatus to be controlled has been controlled. For example, the storage unit 133 may store a control history 1332 for each of a plurality of apparatuses to be controlled.

A control parameter stored as the control history 1332 may be a control parameter that affects the current consumption of the apparatus to be controlled.

Noise generated by the apparatus to be controlled tends to increase with the magnitude of the current consumption of the apparatus to be controlled. According to the above configuration, the master device 13 derives a correlation between a variation in the time-series data of the analog control signal that affects the current consumption and a variation in the time-series data of the signal quality. Therefore, a relationship between noise included in the signal and the apparatus to be controlled can be accurately obtained.

(a) and (b) of FIG. 5 are diagrams showing examples of time-series data of control data which is a digital signal. The vertical axis represents a value (0 or 1) indicated by the digital signal and the horizontal axis represents the time (ms).

(a) and (b) of FIG. 6 are diagrams showing examples of time-series data of control data which is an analog signal. In the examples shown in (a) and (b) of FIG. 6, the vertical axis represents the speed (r/min) of the motor and the horizontal axis represents the time (ms).

A control parameter stored as the control history 1332 may be a measured value of the operation of the apparatus to be controlled. A control parameter stored as the control history 1332 may also be the power consumption of the apparatus to be controlled. In this case, the control history 1332 may indicate a value relative to the maximum power consumption of each device to be controlled.

(Generation Source Specification Control Unit 1321)

The generation source specification control unit 1321 includes an update unit 13210, an acquisition unit 13211, a correlation derivation unit 13212, a noise generation source specification unit 13213, and an specification result output control unit 13214.

(Update Unit 13210)

The update unit 13210 updates a signal quality history 1331 stored in the storage unit 133 using the signal quality of a signal input through the cable which has been received from a slave device (an apparatus to be controlled) 11. The signal quality history 1331 is time-series data of the signal quality of the signal input through the cable in the network in the master-slave control system 1.

FIG. 7 is a diagram showing an example of time-series data of signal quality. The vertical axis represents an SQI value, which is a value corresponding to the level of noise included in the signal, and the horizontal axis represents the time (ms). When the SQI value is low, the signal includes less noise. When the SQI value is high, the signal includes a lot of noise.

(Acquisition Unit 13211)

The acquisition unit 13211 acquires the signal quality history 1331 stored in the storage unit 133. The acquisition unit 13211 also acquires the control history 1332 stored in the storage unit 133. The acquisition unit 13211 outputs the acquired signal quality history 1331 and control history 1332 to the correlation derivation unit 13212.

(Correlation Derivation Unit 13212)

The correlation derivation unit 13212 receives the signal quality history 1331 and the control history 1332 from the acquisition unit 13211.

The correlation derivation unit 13212 derives a correlation value between a variation in the signal quality history 1331 (time-series data of the signal quality) and a variation in the control history 1332 (time-series data of the control data).

As shown in FIG. 2, the master-slave control system 1 includes a plurality of apparatuses to be controlled. The correlation derivation unit 13212 derives a correlation value between a variation in the acquired time-series data of the signal quality and a variation in the acquired time-series data of the control data for controlling each apparatus to be controlled. The correlation derivation unit 13212 outputs a signal indicating the derived correlation value to the noise generation source specification unit 13213.

For example, the correlation derivation unit 13212 may derive a correlation value according to a user's instruction received from the display input device 14 or the like. The correlation derivation unit 13212 may derive the correlation value in real time while the master device 13 receives the signal quality. The correlation derivation unit 13212 may be set to automatically derive the correlation value at predetermined time intervals.

FIG. 8 is a diagram showing an example of a calculation formula that the correlation derivation unit 13212 uses to derive the correlation value. The formula shown in FIG. 8 is a Correl function and the correlation derivation unit 13212 calculates a correlation coefficient between the time-series data of the signal quality and the time-series data of the control data using the function.

x shown in FIG. 8 indicates a value of the signal quality at a certain time and y shown in FIG. 8 indicates a value of the control data at the same time. Further, an x-bar shown in FIG. 8 indicates the standard deviation of the value of the signal quality and a y-bar indicates the standard deviation of the value of the control data.

The correlation coefficient is indicated by a value of −1 or more and 1 or less. When the value of the correlation coefficient is close to 1, it indicates that the positive correlation is high. When the value of the correlation coefficient is close to −1, it indicates that the negative correlation is high. When the value of the correlation coefficient is close to 0, it indicates that the correlation is low.

For example, correlation coefficients of the time-series data of digital control signals shown in (a) and (b) of FIG. 5 with respect to the time-series data of the signal quality shown in FIG. 7 calculated using the function shown in FIG. 8 are as follows. The correlation coefficient of the time-series data of the digital control signal shown in (a) of FIG. 5 is 0.84 and the correlation coefficient of the time-series data of the digital control signal shown in (b) of FIG. 5 is −0.13. That is, the correlation coefficient of the time-series data of the digital control signal shown in (a) of FIG. 5 with respect to the time-series data of the signal quality shown in FIG. 7 is higher than that of the time-series data of the digital control signal shown in of (b) of FIG. 5.

Correlation coefficients of the time-series data of analog control signals shown in (a) and (b) of FIG. 6 with respect to the time-series data of the signal quality shown in FIG. 7 calculated using the function shown in FIG. 8 are as follows. The correlation coefficient of the time-series data of the analog control signal shown in (a) of FIG. 6 is 0.73 and the correlation coefficient of the time-series data of the analog control signal shown in (b) of FIG. 6 is −0.02. That is, the correlation coefficient of the time-series data of the digital control signal shown in (a) of FIG. 6 with respect to the time-series data of the signal quality shown in FIG. 7 is higher than that of the time-series data of the digital control signal shown in of (b) of FIG. 6.

The correlation derivation unit 13212 may also specify a period in which the level of noise in the signal quality history 1331 (the time-series data of the signal quality) is higher than a predetermined value and derive a correlation value in the specified period.

According to this configuration, it is possible to obtain a relationship between noise included in the signal during the period in which the noise is generated and the apparatus to be controlled.

(Noise Generation Source Specification Unit 13213)

As described above, the master-slave control system 1 includes a plurality of apparatuses to be controlled. The noise generation source specification unit 13213 specifies a generation source of noise included in the signal from a plurality of apparatuses to be controlled according to the correlation values received from the correlation derivation unit 13212.

According to this configuration, a generation source of noise can be specified according to the correlation value between a variation in the time-series data of the signal quality and a variation in the time-series data of the control data for controlling each apparatus to be controlled. For example, the noise generation source specification unit 13213 may specify both of the following apparatuses to be controlled as generation sources of noise.

1: An apparatus corresponding to control data having the highest correlation value among a plurality of apparatuses to be controlled that are controlled by analog control signals.

2: An apparatus corresponding to control data having the highest correlation value among a plurality of apparatuses to be controlled that are controlled by digital control signals.

The noise generation source specification unit 13213 may be configured as follows. The noise generation source specification unit 13213 derives an adjusted correlation value by multiplying either the correlation value of the time-series data of the analog control signal with respect to the time-series data of the signal quality or the correlation value of the time-series data of the digital control signal with respect to the time-series data of the signal quality by a coefficient.

For example, when multiplying the correlation value of the time-series data of the digital control signal by a coefficient, the noise generation source specification unit 13213 specifies a generation source of noise as follows. The noise generation source specification unit 13213 specifies the highest correlation value or adjusted correlation value from correlation values of the time-series data of analog control signals and correlation values of the time-series data of digital control signals multiplied by an adjustment value (adjusted correlation values). The noise generation source specification unit 13213 specifies an apparatus to be controlled corresponding to the specified correlation value or adjusted correlation value as a generation source of noise.

On the other hand, when multiplying the correlation value of the time-series data of the analog control signal by a coefficient, the noise generation source specification unit 13213 specifies a generation source of noise as follows. The noise generation source specification unit 13213 specifies the highest correlation value or adjusted correlation value from correlation values of the time-series data of digital control signals and correlation values of the time-series data of analog control signals multiplied by an adjustment value (adjusted correlation values). The noise generation source specification unit 13213 specifies an apparatus to be controlled corresponding to the specified correlation value or adjusted correlation value as a generation source of noise.

According to the above configuration, the noise generation source specification unit 13213 can specify a generation source of noise from a plurality of apparatuses to be controlled including apparatuses to be controlled whose control data is a digital signal and apparatuses to be controlled whose control data is an analog signal.

The noise generation source specification unit 13213 outputs a signal indicating the specified apparatus to be controlled to the specification result output control unit 13214. For example, the noise generation source specification unit 13213 may output the signal, the signal quality history 1331, and the control history 1332 of the specified apparatus to be controlled to the specification result output control unit 13214.

(Specification Result Output Control Unit 13214)

The specification result output control unit 13214 outputs a signal indicating the apparatus to be controlled specified by the noise generation source specification unit 13213 to the display input device 14 through the communication unit 131.

For example, the specification result output control unit 13214 may instruct the display input device 14 through the communication unit 131 to display the time-series data of the control data of the apparatus to be controlled specified as a generation source of noise and the time-series data of the signal quality in parallel.

This configuration allows the user to visually recognize the correlation between the time-series data of the control data of the specified apparatus to be controlled and the time-series data of the signal quality.

The specification result output control unit 13214 may also instruct the display input device 14 through the communication unit 131 to emphasize and display particularly highly correlated portions in a graph of the time-series data of the control data of the apparatus to be controlled and a graph of the time-series data of the signal quality.

(Storage Unit 133)

The storage unit 133 is, for example, an auxiliary storage device such as a flash memory or a solid state drive and stores the signal quality history 1331, the control history 1332, and the like described above.

(Display Input Device 14)

The display input device 14 is, for example, a touch panel type display input device. The user of the master-slave control system 1 can operate the master device 13 through the display input device 14 and check the operating status of the master-slave control system 1 through the display input device 14.

In the present embodiment, in particular, the display input device 14 displays the identification result of the master device 13 or the like. For example, the display input device 14 may receive an instruction from the specification result output control unit 13214 and display a graph showing the control history of the device to be controlled specified as a generation source of noise and a graph showing the signal quality history in parallel as described above.

The above embodiment has been described with regard to a configuration in which a slave device 11 calculates a signal quality of a signal input through the cable and outputs the calculated signal quality to the master device 13. In another configuration, for example, the signal relay device 12 may be configured similar to the signal quality calculation unit 1101 described above and may output the calculated signal quality to the master device 13.

Also, a server device which is external to the master-slave control system 1 may receive a signal indicating the signal quality and perform the process of determining the cause of noise included in a signal which is performed by the master device 13 described above. Specifically, the external server device may be a server device connected to the master device 13 or may be a cloud server device.

§ 3 Exemplary Operation (a) and (b) of FIG. 9 are flowcharts showing an example of a flow of a process executed by the master device 13. (a) of FIG. 9 is a flowchart showing an outline of a flow of the determination process executed by the master device 13. (b) of FIG. 9 is a flowchart showing an example of a flow of the process of specifying a generation source of noise included in a signal which is executed by the noise generation source specification unit 13213. As shown in (a) of FIG. 9, the acquisition unit 13211 acquires the signal quality history 1331 and the control history 1332 stored in the storage unit 133 (S1: acquisition step). Subsequently, the correlation derivation unit 13212 specifies a period in which the level of noise in the signal quality history 1331 is higher than a predetermined value (S2). The step of S2 is not essential in this process. Therefore, the step of S2 may be omitted as appropriate. Subsequently, the correlation derivation unit 13212 derives a correlation value between a variation in the signal quality in the signal quality history 1331 and a variation in the control data in the control history 1332 (S3: correlation derivation step). When this process includes the step of S2, the correlation derivation unit 13212 derives the correlation value in the specified period. Subsequently, the noise generation source specification unit 13213 performs a noise source identification process for specifying a generation source of noise (S4). Subsequently, the specification result output control unit 13214 outputs the result of the identification performed in S4 to the display input device 14 (S5) and the process ends. As described above, the specification result output control unit 13214 may instruct the display input device 14 to display the time-series data of the control data of the apparatus to be controlled specified as a generation source of noise and the time-series data of the signal quality in parallel. That is, the specification result output control unit 13214 may output the signal quality history 1331 and the control history 1332 of the specified apparatus to be controlled to the display input device 14 through the communication unit 131.

Next, an example of the flow of the noise source identification process (S4) executed by the noise generation source specification unit 13213 will be described with reference to (b) of FIG. 9. As shown in (b) of FIG. 9, the noise generation source specification unit 13213 multiplies either correlation values derived from the control history 1332 of analog signals or correlation values derived from the control history 1332 of digital signals by an adjustment coefficient (S41). Subsequently, the noise generation source specification unit 13213 specifies an apparatus to be controlled corresponding to the highest correlation value or adjusted correlation value as a generation source of noise (S42). Thereafter, the process continues to S5.

§ 4 Modification

A modification of the present embodiment will be described below. For convenience of explanation, members having the same functions as the members described in the above embodiment will be denoted by the same reference numerals and the description will not be repeated.

FIG. 10 is a diagram showing an example of master-slave control systems 1b and 1c to which master devices 13 (information processing devices) according to the present modification are applied. Each master device 13 according to the present modification has the following configuration in addition to the configuration described in the first embodiment.

Each master device 13 according to the present modification uses time-series data of signal quality of a signal input through a cable of a network including the master device 13 as the time-series data of the signal quality. For example, in the example shown in FIG. 10, the time-series data of the signal quality is time-series data of signal quality of a signal input through a cable 15 of the master-slave control system 1b.

Each master device 13 according to the present modification uses the following two time-series data as the time-series data of the control data for controlling the operation of an apparatus to be controlled. One is time-series data of control data for controlling the operation of an apparatus to be controlled included in the same network as that including the master device 13, similar to the first embodiment. The other is time-series data of control data for controlling the operation of an apparatus to be controlled included in a network different from that including the master device 13. For example, in the example shown in FIG. 10, the master device 13 included in the master-slave control system 1b uses time-series data of the following two control data. One is time-series data of control data for controlling the operation of a slave device 11c in the master-slave control system 1b. The other is time-series data of control data for controlling the operation of a slave device 11c in the master-slave control system 1c.

In the present modification, control histories 1332 of apparatuses to be controlled which are controlled by the master devices 13 included in the master-slave control systems 1b and 1c are transmitted and received between the master devices 13. For example, the master device 13 included in the master-slave control system 1b receives a control history 1332 from the master device 13 included in the master-slave control system 1c.

The master device 13 according to the present modification can also be expressed as follows.

The master device 13 acquires time-series data of signal quality indicating the level of noise included in a signal input through a cable in the network and time-series data of control data for controlling the operation of an apparatus to be controlled in the network. The master device 13 derives a correlation value between a variation in the time-series data of the signal quality and a variation in the time-series data of the control data.

A plurality of apparatuses to be controlled include the following two apparatuses to be controlled.

1: The apparatus to be controlled that is present in one network that is controlled by one controller and includes the cable.

2: An apparatus to be controlled that is present in a network different from the one network that is controlled by the one controller and includes the cable, the different network being controlled by a controller different from the one controller.

According to the above configuration, it is possible to obtain a relationship between noise in a network and an apparatus to be controlled in a network different from the network.

Therefore, each master device 13 can specify a generation source of noise even when a generation source of noise in a network including the master device 13 is an apparatus in a network different from the network including the master device 13.

For example, as shown in FIG. 10, the slave device 11c included in the master-slave control system 1c can be specified as a generation source of noise in a signal input through the cable included in the master-slave control system 1b.

Second Embodiment

Other embodiments of the invention will be described below. For convenience of explanation, members having the same functions as the members described in the above embodiment will be denoted by the same reference numerals and the description will not be repeated.

§ 1 Exemplary Application

A master-slave control system 1d to which a master device (information processing device) 13d according to the present embodiment is applied includes a master device 13d instead of the master device 13 included in the master-slave control system 1 shown in FIG. 2.

The master device 13d stores a correlation coefficient history 1333d which is time-series data of a correlation value derived by a correlation derivation unit 13212. When a change in the correlation coefficient indicated by the correlation coefficient history 1333d is equal to or greater than a threshold value, the master device 13d determines that there is an abnormality in an apparatus to be controlled corresponding to the time-series data of the correlation value.

For example, if an apparatus to be controlled (such as a contactor or a solenoid) that is a generation source of noise included in a signal input through a cable fails, the noise generated by the apparatus to be controlled is reduced. Thus, the correlation value between a variation in the time-series data of the signal quality and a variation in the time-series data of the control data may change before and after the failure of the apparatus to be controlled. Therefore, according to the above configuration, it is possible to specify an abnormality (such as a failure) of an apparatus to be controlled that is a generation source of noise.

§ 2 Exemplary Configuration

Master-Slave Control System 1

As described above, the master-slave control system 1d to which the master device 13d according to the present embodiment is applied includes the master device 13d instead of the master device 13 included in the master-slave control system 1 shown in FIG. 2. Since the other components are similar to those of the master-slave control system 1, the description thereof will not be repeated here.

(Master Device 13d)

The master device 13d is a control device that controls the entire master-slave control system 1d and is, for example, a programmable logic controller (PLC).

FIG. 11 is a block diagram showing a configuration of the master device 13d according to the present embodiment. As shown in FIG. 11, the master device 13d includes a communication unit 131d, a control unit 132d, and a storage unit 133d.

(Communication Unit 131d)

The communication unit 131d communicates with slave devices 11 through the signal relay device 12. In the present embodiment, in particular, the communication unit 131d receives, from each slave device 11, a signal indicating a signal quality calculated by the slave device 11. The communication unit 131 outputs the received signal quality to an update unit 13210.

The communication unit 131d outputs a control signal for controlling the operation of the slave device 11, a control signal for controlling the operation of an external device 16, or the like to the slave device 11.

The communication unit 131d outputs a signal or the like indicating the result of the determination performed by an abnormality determination unit 13215d to a display input device 14 according to an instruction from a determination result output control unit 13216d.

(Control Unit 132d)

The control unit 132d includes a central processing unit (CPU), a random access memory (RAM), a read only memory (ROM), and the like and controls each component according to information processing. The control unit 132d includes an abnormality determination control unit 1321d and a slave device control unit 1322. Since the slave device control unit 1322 is configured similar to that described in the first embodiment, the description thereof will not be repeated here.

(Abnormality Determination Control Unit 1321d)

The abnormality determination control unit 1321d includes an update unit 13210, an acquisition unit 13211, a correlation derivation unit 13212d, an abnormality determination unit 13215d, and a determination result output control unit 13216d. Since the update unit 13210 and the acquisition unit 13211 are configured similar to those described in the first embodiment, the description thereof will not be repeated.

(Correlation Derivation Unit 13212d)

Similar to the correlation derivation unit 13212, the correlation derivation unit 13212d derives a correlation value (correlation coefficient) between a variation in a signal quality history 1331 and a variation in a control history 1332. The correlation derivation unit 13212d updates a correlation coefficient history 1333d stored in the storage unit 133d using the derived correlation coefficient. The correlation coefficient history 1333d is time-series data of the correlation coefficient between a variation in the time-series data of the signal quality and a variation in the control data for controlling the operation of the apparatus to be controlled. For example, the storage unit 133d may store the correlation coefficient history 1333d for each apparatus to be controlled. The correlation derivation unit 13212d may cause the storage unit 133d to store time-series data of a correlation coefficient of an apparatus to be controlled as a correlation coefficient history 1333d when the correlation coefficient of the apparatus to be controlled has become higher than a predetermined value. Since the method of deriving the correlation coefficient (correlation value) by the correlation derivation unit 13212d is similar to that of the correlation derivation unit 13212 of the first embodiment, the description thereof will not be repeated here.

(Abnormality Determination Unit 13215d)

The abnormality determination unit 13215d determines whether or not there is an abnormality in an apparatus to be controlled.

Specifically, when a change in a correlation coefficient history 1333d (time-series data of a correlation value) is equal to or greater than a threshold value, the abnormality determination unit 13215d determines that there is an abnormality in an apparatus to be controlled corresponding to the correlation coefficient history 1333d.

For example, if an apparatus to be controlled (such as a contactor or a solenoid) that is a generation source of noise included in a signal input through a cable fails, the noise generated by the apparatus to be controlled is reduced. That is, the influence of the apparatus to be controlled upon the noise included in the signal input through the cable is reduced. Accordingly, the correlation value between a variation in the time-series data of the signal quality and a variation in the time-series data of the control data of the apparatus to be controlled is lowered. Thus, the correlation value between a variation in the time-series data of the signal quality and a variation in the time-series data of the control data may change before and after the failure of the apparatus to be controlled. In the present embodiment, the control data stored as the control history 1332 is not a measured value of the operation of the apparatus to be controlled, but a control parameter transmitted to the apparatus to be controlled.

(a) and (b) of FIG. 12 are diagrams showing examples of (a) time-series data of an SQI value (a signal quality) and (b) time-series data of a digital control signal of an apparatus to be controlled when the apparatus to be controlled is in a normal state.

(a) and (b) of FIG. 13 are diagrams showing examples of (a) time-series data of an SQI value (a signal quality) and (b) time-series data of a digital control signal of an apparatus to be controlled when the apparatus to be controlled is in an abnormal state.

The vertical axis in (a) of FIG. 12 and (a) of FIG. 13 represents the level of noise according to the SQI value and the horizontal axis represents the time (ms). The vertical axis in (b) of FIG. 12 and (b) of FIG. 13 represents a value (0 or 1) indicated by the digital signal and the horizontal axis represents the time (ms).

In the examples shown in FIGS. 12 and 13, the master device 13d continuously acquires the SQI value. On the other hand, the correlation derivation unit 13212d derives the correlation value in a predetermined period (for example, every minute). The abnormality determination unit 13215d determines whether or not a correlation value newly derived by the correlation derivation unit 13212d has changed from a previously derived correlation value by a threshold value or more. When the newly derived correlation value has changed from the previously derived correlation value by the threshold value or more, the abnormality determination unit 13215d determines that there is an abnormality in an apparatus to be controlled corresponding to the correlation value. The abnormality determination unit 13215d may be configured to determine that there is an abnormality in an apparatus to be controlled corresponding to a correlation value if a change in the correlation value within a predetermined period, which is not limited to a change in the correlation value from a previously derived correlation value, is equal to or greater than a threshold value. For example, the correlation derivation unit 13212d may be configured to, upon newly deriving a correlation value and updating the correlation coefficient history 1333d, output a signal indicating the update to the abnormality determination unit 13215d. The abnormality determination unit 13215d may start the abnormality determination process using the reception of this signal as a trigger.

The correlation coefficient between a variation in the time-series data of the signal quality and a variation in the time-series data of the control data when the apparatus to be controlled is in a normal state as shown in FIG. 12 is 0.84. On the other hand, the correlation coefficient between a variation in the time-series data of the signal quality and a variation in the time-series data of the control data when the apparatus to be controlled is in an abnormal state as shown in FIG. 13 is 0.46. The difference between the correlation coefficient when the apparatus to be controlled is in a normal state and the correlation coefficient when the apparatus to be controlled is in an abnormal state is 0.38. The abnormality determination unit 13215d determines that there is an abnormality in the apparatus to be controlled, for example, when the threshold value which is a reference value for abnormality determination has been set to 0.2. The threshold value which is a reference value for abnormality determination is not particularly limited although the threshold value has been set to 0.2 for convenience of explanation.

According to the above configuration, it is possible to specify an abnormality (such as a failure) of an apparatus to be controlled that is a generation source of noise.

The abnormality determination unit 13215d outputs a signal indicating the apparatus to be controlled determined to have an abnormality to the determination result output control unit 13216.

The abnormality determination unit 13215d may determine the abnormality of the apparatus to be controlled according to the user's instruction received from the display input device 14 or the like. Further, the abnormality determination unit 13215d may perform the determination in real time while the master device 13 receives the signal quality. The abnormality determination unit 13215d may be set to automatically perform the determination at predetermined time intervals.

(Determination Result Output Control Unit 13216d)

The determination result output control unit 13216d outputs a signal indicating the apparatus to be controlled determined to have an abnormality by the abnormality determination unit 13215d to the display input device 14 through the communication unit 131.

(Storage Unit 133d)

The storage unit 133d is, for example, an auxiliary storage device such as a flash memory or a solid state drive and stores the signal quality history 1331, the control history 1332, the correlation coefficient history 1333d, and the like described above.

§ 3 Exemplary Operation

FIG. 14 is a flowchart showing an example of a flow of a process executed by the master device 13d. Since the steps S1 to S3 shown in FIG. 14 are similar to the steps described in the first embodiment, the description thereof will not be repeated here. Subsequent to S3, the abnormality determination unit 13215d determines whether or not a change in the correlation coefficient history 1333d is equal to or greater than a threshold value (S11). When a change in a correlation coefficient history 1333d is equal to or greater than the threshold value (YES in S11), the abnormality determination unit 13215d determines that there is an abnormality in an apparatus to be controlled corresponding to the correlation coefficient history 1333d (S12). Subsequently, the determination result output control unit 13216d outputs the result determined in S12 to the display input device 14 (S13) and the process ends.

When the change in the correlation coefficient history 1333d is smaller than the threshold value (NO in S11), the abnormality determination unit 13215d determines that the apparatus to be controlled corresponding to the correlation coefficient history 1333d is normal (S14) and the process ends.

[Exemplary Implementation by Software]

The control blocks of the master device 13 (particularly, the update unit 13210, the acquisition unit 13211, the correlation derivation unit 13212, the noise generation source specification unit 13213, and the specification result output control unit 13214) and the control blocks of the master device 13*d* (particularly, the update unit 13210, the acquisition unit 13211, the correlation derivation unit 13212*d*, the abnormality determination unit 13215*d*, and the determination result output control unit 13216*d*) may be implemented by a logic circuit (hardware) formed of an integrated circuit (an IC chip) or the like or may be implemented by software.

In the latter case, the master device 13 and the master device 13*d* each include a computer that executes instructions of a program that is software that implements each function. The computer includes, for example, one or more processors and a computer-readable recording medium that stores the program. The object of the invention is achieved by the processor(s) reading the program from the recording medium and executing the program in the computer. For example, a central processing unit (CPU) can be used as the processor. A "non-temporary tangible medium" such as, for example, a tape, a disc, a card, a semiconductor memory, or a programmable logic circuit as well as a read only memory (ROM) can be used as the recording medium. The computer may further include a random access memory (RAM) or the like for loading the program. The program may also be provided to the computer through an arbitrary transmission medium capable of transmitting the program (such as a communication network or a broadcast wave). An aspect of the invention can also be implemented in the form of a data signal embedded in a carrier wave in which the program is embodied by electronic transmission.

SUMMARY

An information processing device according to an aspect of the invention includes an acquisition unit configured to acquire time-series data of signal quality indicating a level of noise included in a signal input through a cable in a network and time-series data of control data for controlling an operation of an apparatus to be controlled in the network and a correlation derivation unit configured to derive a correlation value between a variation in the time-series data of the signal quality and a variation in the time-series data of the control data.

A control method for an information processing device according to an aspect of the invention includes an acquisition step of acquiring time-series data of signal quality indicating a level of noise included in a signal input through a cable in a network and time-series data of control data for controlling an operation of an apparatus to be controlled in the network, and a correlation derivation step of deriving a correlation value between a variation in the time-series data of the signal quality and a variation in the time-series data of the control data.

According to this configuration, a relationship between noise included in the signal and the apparatus to be controlled can be obtained from the variation in the time-series data of the signal quality of the signal input through the cable and the variation in the time-series data of the control data. For example, a relationship between noise and the apparatus to be controlled can be obtained from control data of the apparatus to be controlled in normal operation.

In the information processing device according to an aspect of the invention, the apparatus to be controlled may include a plurality of apparatuses to be controlled, the correlation derivation unit may be configured to derive the correlation value between the variation in the time-series data of the signal quality and the variation in time-series data of control data for controlling each of the apparatuses to be controlled, and the information processing device may further include a noise generation source specification unit configured to specify a generation source of the noise included in the signal from the plurality of apparatuses to be controlled according to the correlation values.

According to this configuration, a generation source of noise can be specified according to the correlation value between the variation in the time-series data of the signal quality and the variation in the time-series data of the control data for controlling each apparatus to be controlled. For example, the noise generation source specification unit may specify both of the following apparatuses to be controlled as generation sources of noise.

1: An apparatus corresponding to control data having the highest correlation value among a plurality of apparatuses to be controlled that are controlled by analog control signals.

2: An apparatus corresponding to control data having the highest correlation value among a plurality of apparatuses to be controlled that are controlled by digital control signals.

In the information processing device according to an aspect of the invention, the noise generation source specification unit may be configured to derive an adjusted correlation value by multiplying either the correlation value between the variation in the time-series data of the signal quality and the variation in the time-series data of the control data of an apparatus to be controlled whose control data is an analog signal or the correlation value between the variation in the time-series data of the signal quality and the variation in the time-series data of the control data of an apparatus to be controlled whose control data is a digital signal by a coefficient, and specify a generation source of the noise included in the signal by using the adjusted correlation value.

According to this configuration, it is possible to specify a generation source of noise from a plurality of apparatuses to be controlled including an apparatus to be controlled whose control data is a digital signal and an apparatus to be controlled whose control data is an analog signal.

In the information processing device according to an aspect of the invention, the plurality of apparatuses to be controlled may be apparatuses to be controlled present in a network controlled by a controller and including the cable.

According to this configuration, it is possible to specify a generation source of noise from a plurality of apparatuses to be controlled in one network that is controlled by one controller.

In the information processing device according to an aspect of the invention, the plurality of apparatuses to be controlled may include the apparatus to be controlled present in a network controlled by a controller and including the cable and an apparatus to be controlled present in a different network from the network controlled by the controller and including the cable. The different network is controlled by a different controller from the controller.

According to this configuration, for example, it is possible to obtain a relationship between noise in a network and an apparatus to be controlled in a network different from the network.

The information processing device according to an aspect of the invention may further include a specification result output control unit configured to instruct a display input device to display the time-series data of the control data of the apparatus to be controlled specified as the generation source of the noise and the time-series data of the signal quality in parallel.

According to this configuration, the user can visually recognize the correlation between time-series data of control data of the specified apparatus to be controlled and the time-series data of the signal quality.

The information processing device according to an aspect of the invention may include a storage unit configured to store time-series data of the correlation value derived by the correlation derivation unit, and an abnormality determination unit configured to determine that there is an abnormality in the apparatus to be controlled corresponding to the time-series data of the correlation value when a change in the time-series data of the correlation value is equal to or greater than a threshold value.

For example, if an apparatus to be controlled (such as a contactor or a solenoid) that is a generation source of noise included in a signal input through a cable fails, the noise generated by the apparatus to be controlled is reduced. That is, the influence of the apparatus to be controlled upon the noise included in the signal input through the cable is reduced. Thus, the correlation value between a variation in the time-series data of the signal quality and a variation in the time-series data of the control data may change before and after the failure of the apparatus to be controlled. Therefore, according to the above configuration, it is possible to specify an abnormality of an apparatus to be controlled that is a generation source of noise.

In the information processing device according to an aspect of the invention, the correlation derivation unit may be configured to specify a period in which the level of the noise in the time-series data of the signal quality is higher than a predetermined value and derive the correlation value in the specified period.

According to this configuration, it is possible to obtain a relationship between noise included in the signal in the period in which noise is generated and the apparatus to be controlled.

In the information processing device according to an aspect of the invention, the acquisition unit may be configured to acquire an analog control signal that affects a current consumption of the apparatus to be controlled as the control data for controlling the operation of the apparatus to be controlled.

Examples of the control parameter that affects the current consumption of the apparatus to be controlled, for example, when the apparatus to be controlled is an apparatus having a motor, include the acceleration, speed, and the like of the motor. Examples of the control parameter when the apparatus to be controlled is a heater include temperature.

Noise generated by the apparatus to be controlled tends to increase with the magnitude of the current consumption of the apparatus to be controlled. This configuration derives a correlation between a variation in the time-series data of the analog control signal that affects the current consumption and a variation in the time-series data of the signal quality. Therefore, a relationship between noise included in the signal and the apparatus to be controlled can be accurately obtained.

In the information processing device according to an aspect of the invention, the acquisition unit may be configured to acquire an index indicating the level of the noise included in the signal as the signal quality.

Here, the index indicating the level of the noise included in the signal is the value of a signal quality indicator (SQI) or the like. According to this configuration, a relationship between noise included in the signal and the apparatus to be controlled can be obtained from a variation in the index.

In the information processing device according to an aspect of the invention, the acquisition unit may be configured to acquire a signal quality of a signal input to a slave device in a master-slave control system.

According to this configuration, it is possible to obtain a relationship between noise of the input signal in the master-slave control system and the apparatus to be controlled.

The invention is not limited to the above embodiments and various modifications can be made within the scope of the claims, and embodiments obtained by appropriately combining the technical means disclosed in the different embodiments are also included in the technical scope of the invention.

The invention claimed is:

1. An information processing device comprising:
    an acquisition unit configured to acquire time-series data of a signal quality indicating a level of noise included in a signal input through a cable in a network and time-series data of control data for controlling an operation of an apparatus to be controlled in the network;
    a correlation derivation unit configured to derive a correlation value between a variation in the time-series data of the signal quality and a variation in the time-series data of the control data;
    wherein the apparatus to he controlled includes a plurality of apparatuses to he controlled,
    the correlation derivation unit is configured to derive the correlation value between the variation in the time-series data of the signal quality and the variation in the time-series data of the control data for controlling each of the apparatuses to he controlled, and
    the information processing device further comprises a noise generation source specification unit configured to specify a generation source of the noise included in the signal from the plurality of apparatuses to be controlled according to the correlation values.

2. The information processing device according to claim 1, wherein the noise generation source specification unit is configured to derive an adjusted correlation value by multiplying either the correlation value between the variation in the time-series data of the signal quality and the variation in the time-series data of the control data of an apparatus to be controlled whose control data is an analog signal or the correlation value between the variation in the time-series data of the signal quality and the variation in the time-series data of the control data of an apparatus to be controlled whose control data is a digital signal by a coefficient, and specify the generation source of the noise included in the signal by using the adjusted correlation value.

3. The information processing device according to claim 1, wherein the plurality of apparatuses to be controlled are apparatuses to be controlled present in a network controlled by a controller and including the cable.

4. The information processing device according to claim 1, wherein the plurality of apparatuses to be controlled include:
    the apparatus to be controlled present in a network controlled by a controller and including the cable; and
    an apparatus to be controlled present in a different network from the network controlled by the controller and including the cable, the different network being controlled by a different controller from the controller.

5. The information processing device according to claim 1, comprising
    a specification result output control unit configured to instruct a display input device to display the time-series data of the control data of the apparatus to he controlled specified as the generation source of the noise and the time-series data of the signal quality in parallel.

6. The information processing device according to claim 1, comprising:
a storage unit configured to store time-series data of the correlation value derived by the correlation derivation unit and
an abnormality determination unit configured to determine that there is an abnormality in the apparatus to be controlled corresponding to the time-series data of the correlation value when a change in the time-series data of the correlation value is equal to or greater than a threshold value.

7. The information in processing device according to claim 1, wherein the correlation derivation unit is configured to specify a period in which the level of the noise in the time series data of the signal quality is higher than a predetermined value and derive the correlation value in the specified period.

8. The information processing device according to claim 1, wherein the acquisition unit is configured to acquire an analog control signal that affects a current consumption of the apparatus to be controlled as the control data for controlling the operation of the apparatus to be controlled.

9. The information processing device according to claim 1, wherein the acquisition unit is configured to acquire an index indicating the level of the noise included in the signal as the signal quality.

10. The information processing device according to claim 1, wherein the acquisition unit is configured to acquire a signal quality of a signal input to a slave device in a master slave control system.

11. A control method for an information processing device, the control method comprising:
an acquisition step acquiring time-series data of a signal quality indicating a level of noise included in a signal input through a cable in a network and time-series data of control data for controlling an operation of an apparatus to he controlled in the network;
a correlation derivation step of deriving a correlation value between a variation in the time-series data of the signal quality and a variation in the time-series data of the control data;
wherein the apparatus to be controlled includes a plurality of apparatuses to be controlled,
the correlation derivation step of deriving the correlation value between the variation in the time series data of the signal quality and the variation in the time-series data of the control data for controlling each of the apparatuses to he controlled, and
a noise generation source specification step of specifying a generation source of the noise included in the signal from the plurality of apparatuses to be controlled according to the correlation values.

* * * * *